United States Patent

Hostetler

[11] Patent Number: 5,913,390
[45] Date of Patent: Jun. 22, 1999

[54] ELECTRO-MECHANICAL ACTUATOR FOR A DRUM BRAKE

[75] Inventor: Darwin D. Hostetler, Berrien Springs, Mich.

[73] Assignee: Robert Bosch Technology Corp., Broadview, Ill.

[21] Appl. No.: 08/980,521

[22] Filed: Dec. 1, 1997

[51] Int. Cl.⁶ .................................................. F16D 51/00
[52] U.S. Cl. ..................... 188/79.51; 188/78; 188/79.54; 188/326; 188/156
[58] Field of Search ........................ 188/78, 79.51–79.62, 188/325, 326, 328, 331, 332, 156

[56] References Cited

U.S. PATENT DOCUMENTS

| 1,175,286 | 3/1916 | Myers | 188/328 |
|---|---|---|---|
| 1,805,190 | 5/1931 | Semmes | 188/328 |
| 1,875,571 | 9/1932 | Delahaye | 188/328 |
| 2,002,813 | 5/1935 | Harper et al. | 188/326 |
| 2,132,049 | 10/1938 | Schlumbrecht | 188/331 |
| 2,289,506 | 7/1942 | Kuebler | 188/78 |
| 3,196,987 | 7/1965 | Moore et al. | 188/78 |
| 3,265,161 | 8/1966 | Croissant et al. | 188/79.62 |
| 4,850,459 | 7/1989 | Johannesen et al. | 188/156 |

*Primary Examiner*—Chris Schwartz
*Attorney, Agent, or Firm*—Leo H McCormick, Jr.; Warren Comstock

[57] ABSTRACT

A drum brake (10) having first (14) and second (16) brake shoes retained on a backing plate (20) and moved into engagement with a drum (18) to effect a brake application corresponding to a desired braking input supplied to a actuator member (28) is disclosed. The actuator member (28) has a housing (50) with a first bore (54) therein connected to a cross-bore (56). A pinion (58) located in the first bore (54) has a shaft with first end (60) and a second end (62). The shaft has teeth (58) thereon adjacent the first end (60) and a gear (64) connected to the second end (62). First (74) and second (76) racks which are located in the cross-bore (56) have teeth (67,67') thereon which mesh with the teeth (68) on the pinion (58). A first linkage member (28) connects the first rack (74) with the first brake shoe (14) while a second linkage member (28') connects the second rack (76) with the second brake shoe (16). The pinion (58) receives a rotary torque corresponding to a desired braking input which is translated into linear movement of the first (74) and second (76) racks through the meshing of the first teeth (68) with the second teeth (67,67'). The linear movement of the first (74) and second (76) racks supply a force which moves the first (14) and second (16) brake shoes into engagement with the drum (18) to effect a desired brake application. A lever (90) connected to the pinion (58) adjusts the first (28) and second (28') linkage members to maintains a desired running clearance between the first (14) and second (16) brake shoes and drum (18).

7 Claims, 4 Drawing Sheets

ELECTRO-MECHANICAL ACTUATOR FOR A DRUM BRAKE

This invention relates to a pinion powered by an electric motor for moving opposing first and second racks to provide a force for moving corresponding first and second friction linings into engagement with a drum to effect a brake application.

BACKGROUND OF THE INVENTION

Electrically operated brakes have been developed and used on vehicles for a period of time. A desirable characteristic offered by such brakes reside in their simplicity and a reduction in the overall weight of a vehicle is often is achieved. Examples of such brakes can be found in the following U.S. Pat. Nos. 4,793,447; 4,804,073; 4,850,459; 4,928,543; 4,944,372; and 5,201,387. In these brakes, an output torque from an electric motor is modified through the use of various gears to provide an input for moving brake pads into engagement with another member to effect a brake application. A concern in the operation of such brakes is the speed at which the actuation force develops and the intensity of the resulting actuation force produced to bring the vehicle to a stop within a desired braking distance during a brake application In vehicles having electric brakes it is desirable to have sensors associated with the individual wheels to supply a controller with an indication of the braking of each wheel in order to regulate the individual wheel operational signals to achieve a smooth, balanced and effective stop. While electrically operated brake systems meet current standards of operation their use has generally been limited to use in brake systems for towed vehicles.

SUMMARY OF THE INVENTION

A primary object of the present invention is to provide a brake system with actuation structure through which an operational force is supplied to move friction linings into engagement with a brake drum to provide a smooth, effective and efficient brake application.

According to this invention, an individual brake module for a vehicle would include a drum brake in which first and second brake shoes are urged by an actuator as a function of torque developed by an electric motor in response to an input signal supplied by a controller by an operator to effect a brake application. The actuator includes a pinion which is rotated by a gear arrangement connected to the electric motor. Rotation of the pinion supplies opposing first and second racks with an input to linearly move friction lining associated with the first and second brake shoes into engagement with the drum to effect the brake application. An adjustment lever connected to the pinion responds to the rotary movement of the pinion to modify the linkage between the first and second racks and first and second brake pads, respectively, to compensate for wear of the lining of a brake pad and to assure that the distance required to move the first and second brake pads to effect a brake application does not exceed a predetermined distance.

An advantage of this brake system is provided by utilizing opposing first and second racks which are driven by rotational torque applied to a pinion by an electric motor to provide a balanced actuation force for moving first and second linings into engagement with a drum to effect a smooth brake application.

A further advantage of this brake system is provided by the adjustment member which responds to rotary movement of a pinion to compensate for wear of a lining.

DETAILED DESCRIPTION

Figure 1:
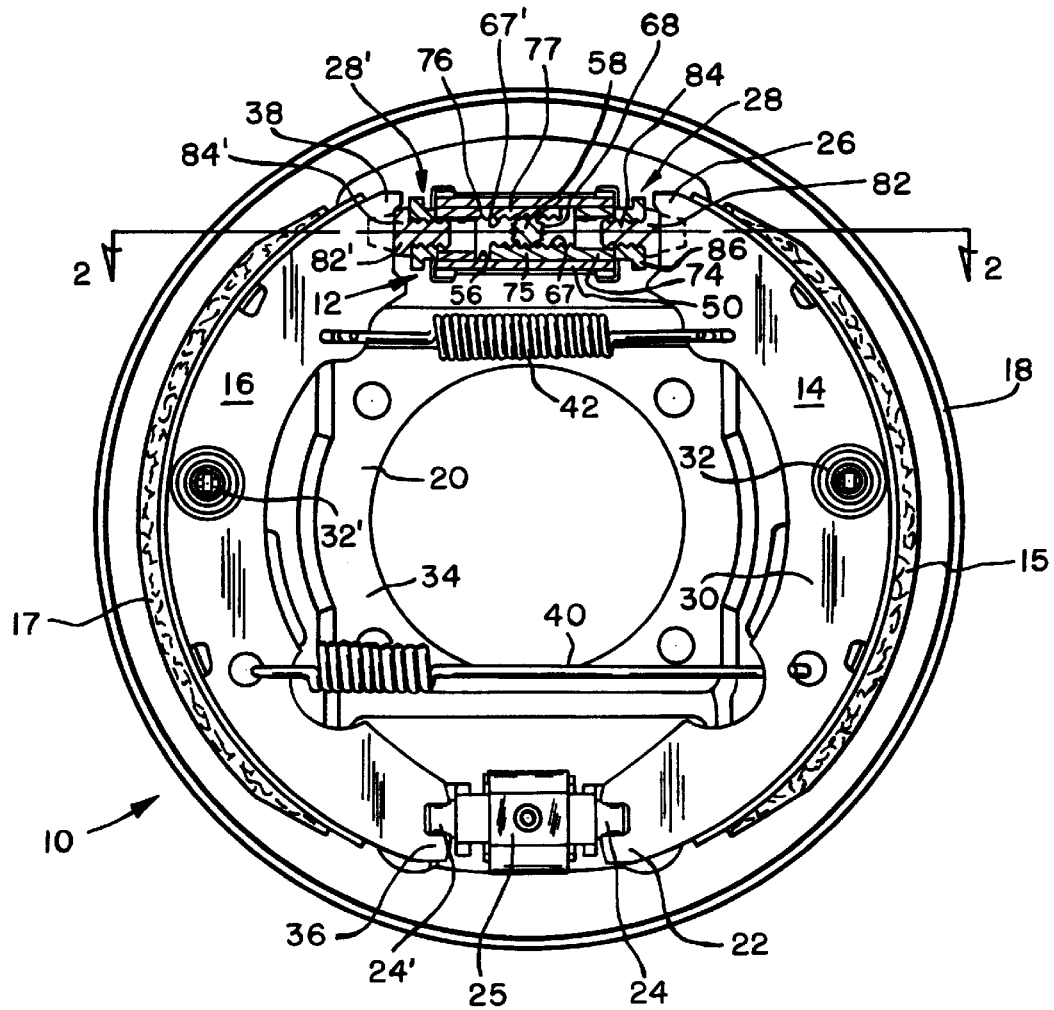
FIG. 1 is a schematic illustration of a drum brake system with a sectional end view of a rack and pinion actuator made according to the principals of the present invention.

The drum brake assembly 10 illustrated in FIG. 1 includes rack and pinion actuator 12 retained on a backing plate 20 through which friction linings 15 and 17 respectively associated with first 14 and second 16 brake shoes are moved into engagement with a drum 18 to effect a brake application.

The first brake shoe 14 has a web 30 with a first end 22 located on anchor pin 24 connected to a load sensor 25 and a second end 26 connected by linkage 28 to the rack and pinion actuator 12. The web 30 is mounted on backing plate 20 by resilient pins 32 which allows the second end 26 to pivot about the first end 22 in response to an actuation force supplied by the rack and pinion actuator 12 to move friction pad 15 into engagement with drum 18 during a brake application.

The second brake shoe 16 has a web 34 with a first end 36 located on anchor pin 24' connected to a load sensor 25 and a second end 38 connected by linkage 28' to the rack and pinion actuator 12. The web 34 is mounted on backing plate 20 by resilient pin 32' which allows the second end 38 to pivot about the first end 36 in response to an actuation force supplied by the rack and pinion actuator 12 to move friction pad 17 into engagement with drum 18 during a brake application.

Figure 2:
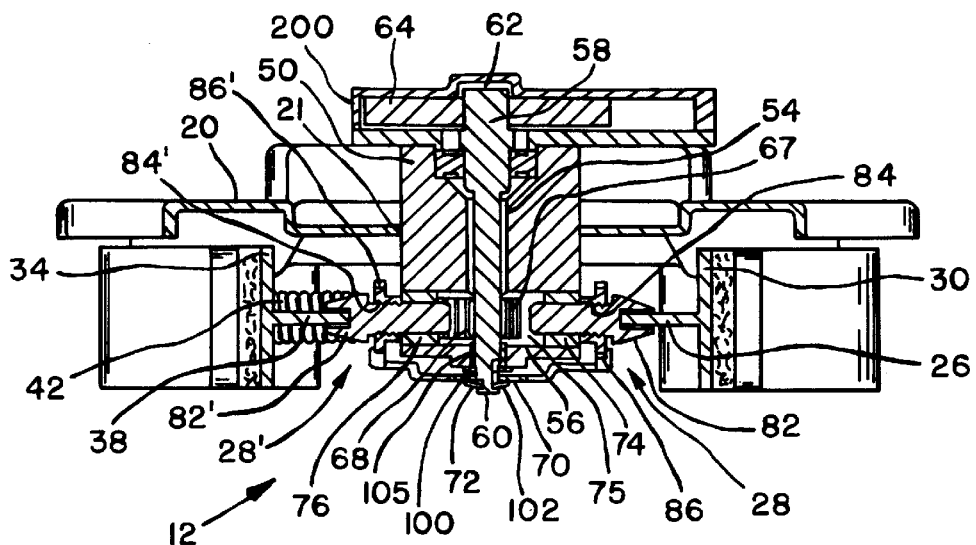
FIG. 2 a sectional view taken along line 2—2 of FIG. 1 with an adjustment lever added thereto.
Figure 3:
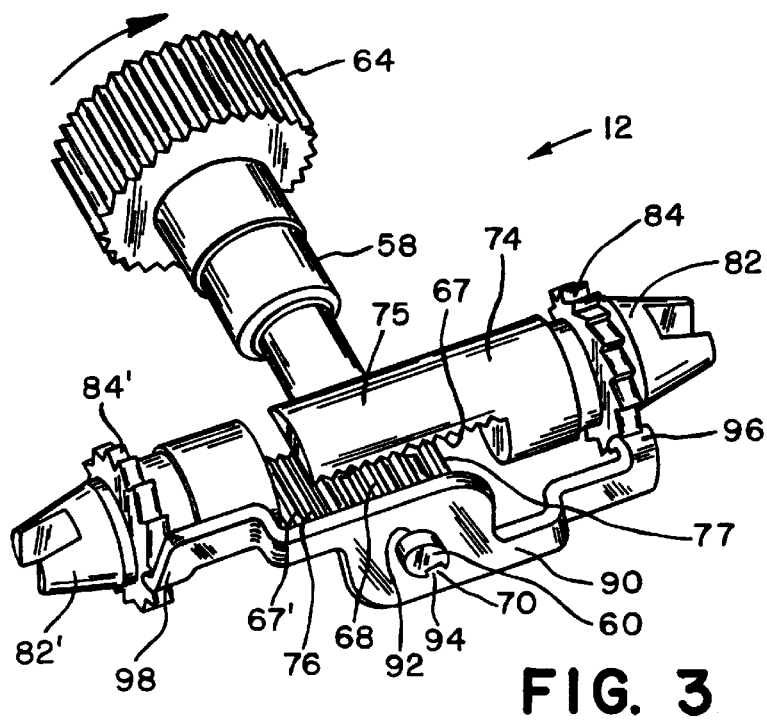
FIG. 3 is an exploded view of the internal component parts of the actuator of FIG. 1.

A prospective view of the rack and pinion actuator 12 of FIG. 1 is illustrated in FIG. 3 and the sectional view illustrated in FIG. 2. The rack and pinion actuator 12, includes a housing 50 which is located and retained in opening 21 of backing plate 20 by respectively 5 locating tabs 19,19' in grooves 52,52' on the top and bottom of the housing 50, see FIGS. 6 and 7. Housing 50 has an axial bore 54 for accepting pinion 58 and a cross bore 56 for receiving the opposing rack members 74 and 76. Pinion 58 has a shaft with first end 60 which extends through the housing 50 and a second end 62. Pinion 58 has teeth 68 located between the first end 60 and the second end 62 and an axial slot 70 located adjacent a radial groove 72 on the first end 60. A gear 64 is attached to the second end 62 of pinion 58 for receiving an input from a sun gear 200 associated with an electric motor. The teeth 68 are designed to be positioned in the cross bore 56 when pinion 58 is positioned in bore 54. The first rack 74 has a projection 75 with teeth 67 thereon which mesh with teeth 68 on pinion 58 while a second rack 76 has a projection 77 with teeth 67' thereon which also mesh with teeth 68 on pinion 58.

The first linkage 28 has a yoke member 82 with a threaded shaft 84 which is joined with a star nut 86. Star nut 86 is positioned adjacent the end of the first rack 74 and yoke member 82 brought into engagement with end 26 of the first web 30. The second linkage 28' has a yoke member 82' with a threaded shaft 84' which is joined with a star nut 86'. Star nut 84' is positioned adjacent the end of the second rack 76 and yoke member 82' brought into engagement with end 38 of the second web 34.

The first 14 and second 16 shoes are resiliently biased toward each other by springs 40 and 42 to assure that the first and second ends of webs 30 and 34 remained engaged with the fixed anchor plate 24 and linkage members 28,28' remain connected with the first 74 and second 76 racks to define a running clearance between the friction linings 15 and 17 and drum 20.

The adjustment lever 90, see FIGS. 2, 3,4, 6 and 8, has a center opening 92 with a tab 94 which is located in axial slot 70 adjacent end 60 of pinion 58. Adjustment lever 90 has first protrusion 96 which engages the first star nut 84 and second protrusions 98 which engages the second star nut 84'. A wave washer 100 is retained on pinion 58 by a snap ring 102 which is located in groove 72. The wave washer 100 acts on and holds adjustment lever 90 against a thrust washer 104 located between the adjustment lever 90 and housing 50. A bushing 105 affixed in housing 50 provides a bearing surface to maintain pinion 58 in axial alignment within axial bore 54.

MODE OF OPERATION OF THE INVENTION

When a brake application is desired, an operator supplies an input to a controller which supplies an operational signal to electric motor. The output from the electric motor is translated by sun gear 200 to gear 64. The torque from gear 64 is carried by teeth 68 of pinion 58 into teeth 67,67' to provide linear movement of the opposing first 74 and second 76 racks. Movement of the first 74 and second 76 racks provide a force which pivots end 26 of the first web 30 and end 38 of the second web 34 about anchor plate 24 to bring friction linings 15 and 17 into engagement with drum 20 to effect a brake application.

Figure 4:
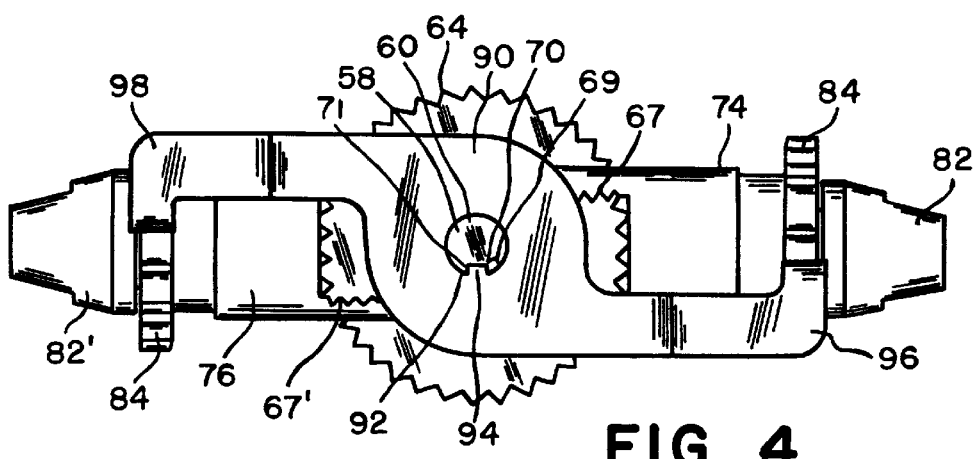
FIG. 4 is a view of the adjustment lever illustrating the relationship between the adjustment lever and a star nut wherein the friction lining of a brake shoe is new and not worn.
Figure 5:
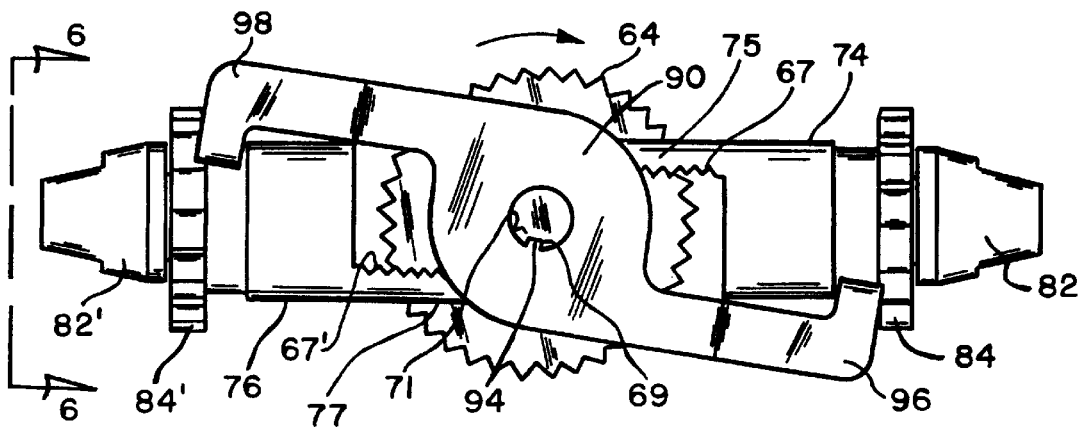
FIG. 5 is a view of the adjustment lever illustrating the relationship between the adjustment lever and star nut when the lining of the brake shoe has been reduced through wear.
Figure 6:
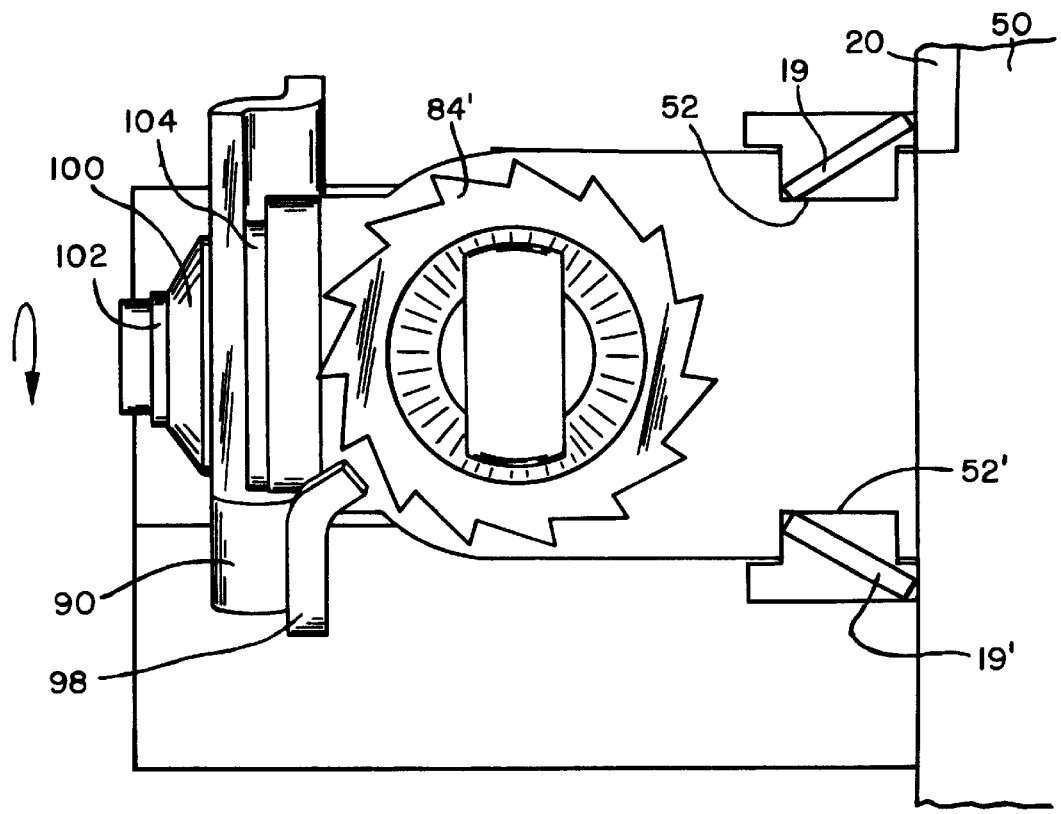
FIG. 6 is an end view taken along line 6—6 of FIG. 5.
Figure 7:
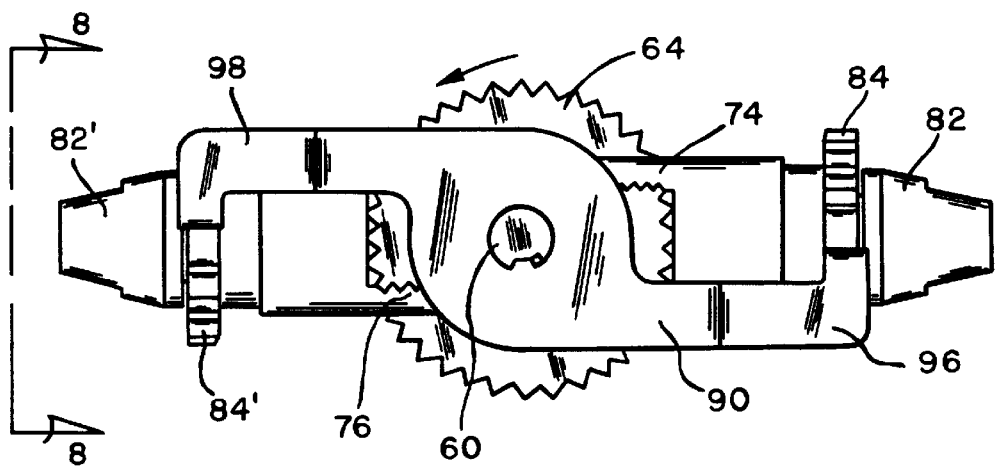
FIG. 7 is a the adjustment lever after the linkage between the rack and first and second brake shoes has been modified as a result of the operation of the adjustment lever.
Figure 8:
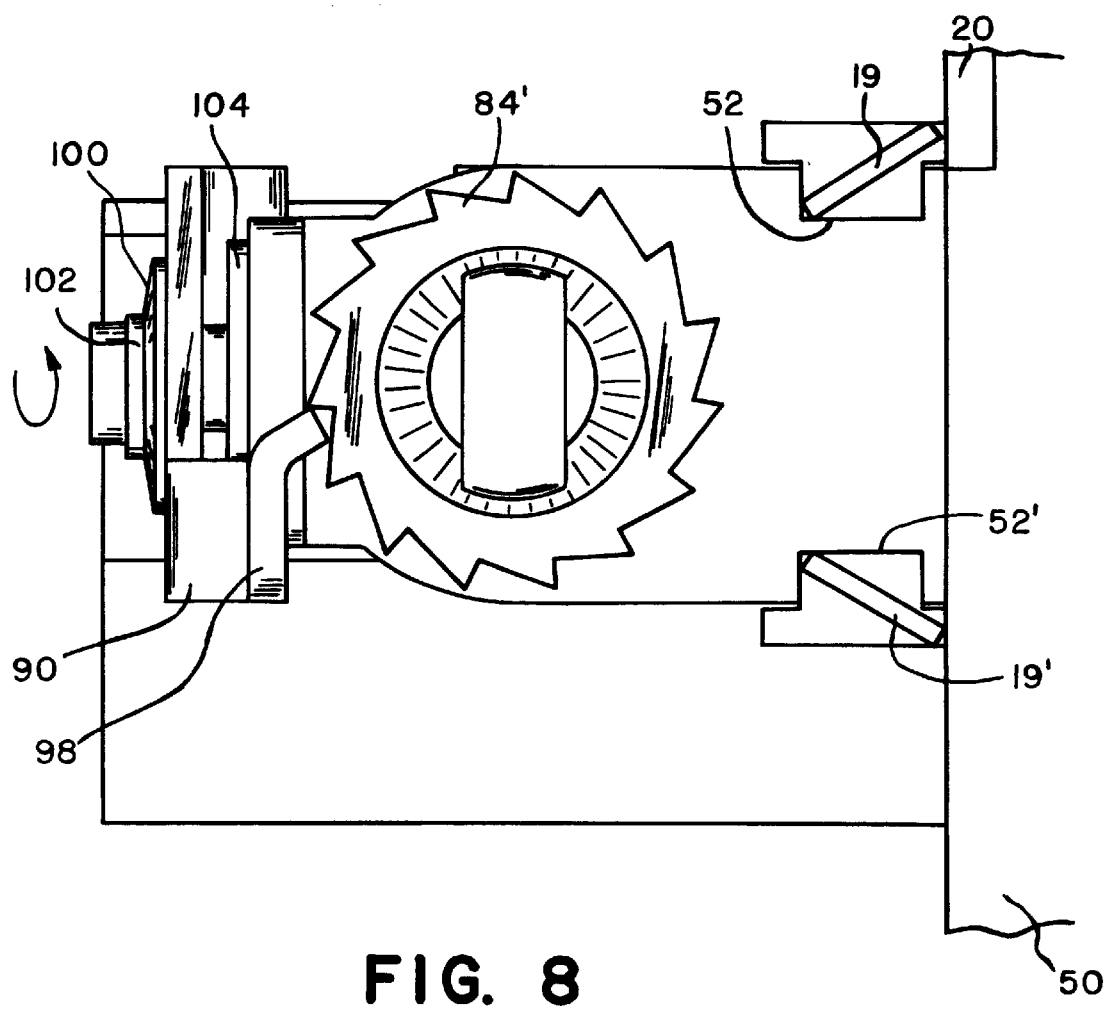
FIG. 8 is an end view taken along line 8—8 of FIG. 7.

In the rest position, friction pads 15 and 17 have a desired running clearance with drum 18 and the adjustment lever 90 is positioned in a manner as illustrated by FIG. 4. The adjustment lever 90 remains stationary when the opposing first 74 and second 76 racks linearly move to provide an operating force to move the first 14 and second 16 brake shoes tab 94 is located in axial slot 70. After a period of time and use the friction linings 15 and 17 wear and as a result the linear translation required for the first 74 and second 76 racks to move the friction linings 15 and 17 into engagement with the drum 18 increases. When such wear occurs, the angular rotation of pinion 58 increases and as a result tab 94 now engages the a first wall 69 of axial slot 70 such that lever 90 is rotated. As adjustment lever 90 is rotated, it slides axially along first wall 69 in response to a force provided by wave washer 100 causing the first protrusion 96 to index over a tooth on star nut 86 and the second protrusion 96 to index over a tooth on star nut 86' in a manner as illustrated in FIGS. 5 and 6. On termination of the torque to gear 68, pinion 58 returns to a rest position and as a result a second wall 71 of axial slot 70 engages tab 94 causing the star nuts 86,86' to respectively rotate with respect to yoke members 82,82' and increase or modify the linkages 28,28' between the first 74 and second 74 racks and web 30 and 34 in a manner as illustrated in FIG. 7. As star nuts 86,86' rotate, adjustment lever 90 compresses wave washer 100 and return to the rest position as illustrated in FIG. 8. The arcuate rotation associated with inducing rotation of the adjustment lever 90 is selected as a function of the barbs on the star nuts 86,86' to initiate modification or adjustment of the linkage 28,28' to assure maintain a desired linear distance for moving the friction pads 15 and 17 into engagement with the drum 18 to effect a brake application.

I claim:

1. In a drum brake having first and second brake shoes retained on a backing plate and moved into engagement with a drum to effect a brake application corresponding to a desired braking input supplied to a actuator member, said actuator member comprising:

a housing having a first bore therein connected to a cross-bore, a pinion located in said first bore and having a first end and a second end, said pinion having first teeth thereon adjacent said first end and a gear connected to the second end;

a first rack located in said cross bore and having second teeth thereon which mesh with said teeth on said pinion;

a second rack located in said cross bore and having third teeth thereon which mesh with said teeth on said pinion;

first linkage means for connecting said first rack with said first brake shoe;

second linkage means for connecting said second rack with said second brake shoe, said pinion receiving a rotary torque corresponding to said desired braking input causing rotation which is translated into linear movement of said first and second racks through the meshing of said first teeth with said second and third teeth, said linear movement of said first and second racks supplying a force to move said first and second brake shoes into engagement with said drum to effect a desired brake application.

2. The drum brake as recited in claim 1 further including;

an adjustment lever connected to said pinion and said first and second linkage means to maintain a desired running clearance between said first and second brake shoes and said drum.

3. The drum brake as recited in claim 2 wherein said pinion includes:

a shaft with an axial slot located adjacent said first end, said axial slot having an arcuate length corresponding to a desired adjustment sequence for said running clearance.

4. The drum brake as recited in claim 3 wherein said adjustment lever includes an opening with a tab thereon which is located in said axial slot on said shaft, said pinion on rotating bringing a wall of said axial slot into engagement with said tab and after a predetermined arcuate rotation moving said adjustment lever through an arcuate rotation.

5. The drum brake as recited in claim 4 wherein said first linkage means includes:

a first yoke member which engages and is held by said first brake shoe; and a first star nut threadingly engaging said first yoke member and connected to said first rack, said arcuate rotation of said adjustment lever causing said first star nut to correspondingly rotate on threads of said first yoke member to change the length between the first rack and first brake shoe to maintain a desired running clearance with said drum.

6. The drum brake as recited in claim 5 wherein said second linkage means includes:

a second yoke member which engages and is held by said second brake shoe; and a second star nut threadingly engaging said second yoke member and connected to said second rack, said arcuate rotation of said adjustment lever causing said second nut to correspondingly rotate on threads of said second yoke member to change the length between the second rack and second brake shoe to maintain a desired running clearance with said drum.

7. The drum brake as recited in claim 6 wherein said gear on said pinion receives an input from an electric motor.

\* \* \* \* \*